United States Patent [19]
Webb et al.

[11] Patent Number: 5,563,710
[45] Date of Patent: Oct. 8, 1996

[54] IMAGING SYSTEM WITH CONFOCALLY SELF-DETECTING LASER

[75] Inventors: Robert H. Webb, Lincoln; Fran J. Rogomentich, Concord, both of Mass.

[73] Assignee: The Schepens Eye Research Institute, Inc., Boston, Mass.

[21] Appl. No.: 330,975

[22] Filed: Oct. 28, 1994

[51] Int. Cl.⁶ .......................... G01N 21/47; G01N 21/55
[52] U.S. Cl. ............................................. 356/445; 356/447
[58] Field of Search ..................................... 356/445, 447

[56] References Cited

U.S. PATENT DOCUMENTS 5,028,802  7/1991  Webb et al. ............................ 250/571

OTHER PUBLICATIONS

Tkach, R. W. et al., "Regimes of Feedback Effects in 1.5-μm Distributed Feedback Lasers", *J. Lightwave Tech.*, vol. LT–4, pp. 232–238 (Nov. 1986).

Chung, Y. C. et al., "Spectral Characteristics of Vertical-Cavity Surface–Emitting Lasers with External Optical Feedback", *IEEE Photonics Technology Letters*, vol. 3, pp. 597–599 (Jul. 1991).

Juskaitis, R. et al., "Fibre–Optic Based Confocal Scanning Microscopy with Semiconductor Laser Excitation and Detection", *Electronics Letters*, vol. 28, pp. 986–988 (May 1992).

Juskaitis, R. et al., "Imaging in reciprocal fibre–optic based confocal scanning microscopes", *Optics Communications 92 North–Holland*, vol. 92, pp. 315–325 (Sep. 1992).

Juskaitis, R. et al., "Fibre–optic based confocal microscopy using laser detection", *Optics Communications 99 North–Holland*, vol. 99, pp. 105–113 (May 1993).

Juskaitis, R. et al., "Spatial filtering by laser detection in confocal microscopy", *Optics Letters*, vol. 18, pp. 1135–1137 (Jul. 1993).

Juskaitis, R. et al., "Semiconductor laser confocal microscopy", *Applied Optics*, vol. 33, pp. 578–584 (Feb. 1994).

*Primary Examiner*—Frank Gonzalez
*Assistant Examiner*—Jason D. Eisenberg
*Attorney, Agent, or Firm*—Lahive & Cockfield

[57] ABSTRACT

The invention relates to a confocal laser imaging system and method. The system includes a laser source, a beam splitter, focusing elements, and a photosensitive detector. The laser source projects a laser beam along a first optical path at an object to be imaged, and modulates the intensity of the projected laser beam in response to light reflected from the object. A beam splitter directs a portion of the projected laser beam onto a photodetector. The photodetector monitors the intensity of laser output. The laser source can be an electrically scannable array, with a lens or objective assembly for focusing light generated by the array onto the object of interest. As the array is energized, its laser beams scan over the object, and light reflected at each point is returned by the lens to the element of the array from which it originated. A single photosensitive detector element can generate an intensity-representative signal for all lasers of the array. The intensity-representative signal from the photosensitive detector can be processed to provide an image of the object of interest.

21 Claims, 4 Drawing Sheets

IMAGING SYSTEM WITH CONFOCALLY SELF-DETECTING LASER

BACKGROUND OF THE INVENTIONS

The invention generally relates to optical instruments and methods. More particularly, the invention relates to a confocal laser system for scanning a surface or other object with a laser beam and generating an image of the object.

Optical scanning imaging techniques are employed in devices such as scanning laser microscopes (SLM), confocal scanning laser microscopes (CSLM), tandem scanning confocal microscopes (TSM), scanning laser ophthalmoscopes (SLO), and flying spot television (FSTV) devices. Confocal imaging systems can provide enhancements in contrast and in dynamic range. Certain of these imaging systems include moving optical elements for deflecting a laser beam, so that an illumination spot is swept across the object to be scanned. Other such systems employ mechanical elements to rotate an illuminated pinhole for the same purpose. In the TSM, a plurality of illumination spots is moved simultaneously, to provide source multiplexing, necessary because the source does not have the higher radiance (brightness) of a laser.

A double scanning optical apparatus is disclosed in U.S. Pat. No. 4,764,005 of Webb et al., the teachings of which are incorporated herein by reference. The apparatus utilizes multiple scanning elements, including a multifaceted rotating polygonal reflector scanner, to provide scanning of both incident and reflected light at television-rate frequencies.

Additionally, certain flying spot imagers us a cathode ray tube (CRT) as a light source, with a single illuminated point scanned across the CRT face. The tube face is imaged onto the object to provide the illumination raster.

A TSM is discussed in Petran et al., "Tandem-Scanning Reflected-Light Microscope," *Journal of the Optical Society of America*, Vol. 58, No. 5, pp. 661–664, May 1968. Petran et al. observe that reflected-light microscopy of semi-transparent material is usually unsatisfactory because of low contrast and light scattering. In the TSM, in which both the object plane and the image plane are scanned in tandem, only light reflected from the object plane is included in the image. In the Petran et al. system, the object is illuminated with light passing through holes in one sector or side of a rotating scanning disk, known as a Nipkow disc. The scanning disk is imaged by the objective at the object plane. Reflected-light images of these spots are directed to the diametrically opposite side of the same disk. Light can pass from the source to the object plane, and from the object plane to the image plane, only through optically congruent holes on diametrically opposite sides of the rotating disk. This configuration produces an image having enhanced contrast and sharpness relative to a conventional reflected-light microscope.

Tandem scanning confocal arrangements and flying spot CRT configurations, however, are "light-starved" by the limited brightness of the illumination spot. In TSM configurations, this brightness limitation is partially compensated by the multiplex operation. TSM systems, however, are hampered by stray light scattered from the moving pinhole array. A general reference for microscopy is *The Handbook of Biological Confocal Microscopy*, Pawley, 2nd. ed., Plenum, 1991.

A further advance in confocal scanning laser microscopy is disclosed in U.S. Pat. No. 5,028,802 (Webb et al.) in which a laser source comprising a microlaser array scans the surface of an object. A beam splitter directs the light reflected from the object to a detector array. The detector array can be scanned in synchrony with scanning the microlaser array to detect light reflected from the object due to each microlaser in the laser source. Here, the "scanning" may be entirely an electronic switching operation, reducing the alignment, spatial filtering, optical aberration and mechanical distortion problems associated with most optical scanning arrangements.

An alternative approach to scanning laser microscopy is disclosed in Juskaitis et al., "Fibre-Optic Based Confocal Scanning Microscopy with Semiconductor Laser Excitation and Detection," *Electronics Letters*, Vol. 28, No. 11, pp. 986–988, May 1992; Juskaitis et al., "Fibre-Optic Based Confocal Microscopy Using Laser Detection," *Optics Communications*, Vol. 99, No. 12, pp. 105–113, December 1992; and Juskaitis et al., "Spatial Filtering by Laser Detection In Confocal Microscopy." *Optics Letters*, Vol. 18, No. 14, pp. 1135–1137, July 1993. As with previous systems, Juskaitis et al. image an object by projecting a laser beam at the object. However, instead of detecting reflected light from the object, Juskaitis et al. feedback the reflected light to the laser source. The laser source in turn, increases or decreases its power in response to the remitted light. Juskaitis et al. detect an image signal as a modulation on a power-monitor signal derived from a power monitor diode, located behind the laser source. Alternatively, in the case of a semiconductor laser, they measure the drive voltage to the laser.

Further improvements over the above discussed systems are desirable. By way of example, the aforesaid Webb et al. patent solves light starvation problems and uses no moving parts, however, requires an array of detectors that is scanned in synchrony with a microlaser source array to achieve confocality. Arrays of detectors can be costly and can complicate the design of the microscope. By way of further example, Juskaitis et al. attempt an alternative approach to using the reflected light from the object to develop the imaging signal. However, Juskaitis et al. employ mirrors to scan the image of a laser source over the object being scanned.

Accordingly, an object of the present invention is to provide an improved confocal laser imaging system that requires no moving parts.

Another object of the present invention is to provide a compact and reliable laser imaging system that generates an image by detecting output intensity of a laser source.

Other general and specific objects of the invention will in part be obvious and will in part appear hereinafter.

SUMMARY OF THE INVENTION

The invention relates to a confocal laser imaging system and method using self-detection. According to one preferred embodiment, the system includes a laser source which is preferably a laser array, a focusing element and a photosensitive detector. The laser source emits a laser beam which is focused along a first optical path at the object to be imaged. Light reflected back to the laser source from the object modulates the intensity of the laser beam. A beam splitter is located in the first optical path to deflect a portion of the laser beam from the first optical path along a second optical path onto the photosensitive detector. The photosensitive detector detects the intensity of the deflected portion of the laser beam, and generates an electrical signal indicative thereof. The generated electrical signal can be processed to yield an image of the object. The object can be for example, a liquid, a gas, or a solid.

According to another embodiment, the invention includes a cube beam splitter. The cube beam splitter includes first and second opposing surfaces in the first optical path and a third surface in the second optical path, with a beam splitter for deflecting a portion of the laser beam from the first optical path along the second optical path. The laser source can be coupled to the first surface and the photosensitive detector can be coupled to the third surface. Additionally, a lens or other objective assembly can be mounted on the second surface for focusing the laser beam from the laser source to the object and for directing the light reflected from the object, due to the laser beam, back to the laser source. A lens can also be mounted on the surface for focusing the deflected portion of the laser beam onto the photosensitive detector.

The laser source can be an electrically scannable microlaser array, including elements for generating a line or matrix array of discrete non-overlapping laser beams in response to electrical excitations addressed to the laser. Similarly, the photosensitive detector can be a single detector or a detector array. According to one preferred construction, the detector is a single avalanche photodiode detector, which receives output light from all or a plurality of the lasers of an array. According to another embodiment, the detector can be an array of avalanche photodiode detectors. As described in detail below, where a detector array is employed, the detectors of the array detect in unison.

In the case where the laser source is a scannable microlaser array, the system includes addressing elements for generating time-varying electrical excitations to address the laser in an excitation scanning pattern. The beam splitter can also deflect a portion of each of the non-overlapping laser beams along the second optical path. Additionally, the photosensitive detector can be a single detector having sufficient detecting area such that each portion of the non-overlapping laser beams is incident on the single detector. For example, a microscope objective may image the entire lasing area onto a one millimeter diode.

The invention includes a method for generating an image of an object. According to the invention, the method includes the following steps: projecting a laser beam along a first optical path at the object; directing the laser light reflected from the object back into the laser source to modulate the intensity of the laser beam; deflecting a portion of the laser beam from the first optical path along a second optical path to a photosensitive detector; detecting the intensity of the deflected portion and generating an electrical signal representative thereof; and generating an image of an object from the electrical signal.

The invention will next be described in connection with certain illustrated embodiments. However, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF THE ILLUSTRATED EMBODIMENTS

The invention provides a confocal scannable laser imaging system that employs self-detection. According to the invention, the system illuminates a surface or other object with a laser beam, modulates the intensity of the laser beam in response to light reflected from the object, detects changes in the intensity of the of the laser beam reflecting this modulation, and generates an image of the object from the detected changes.

Figure 1:
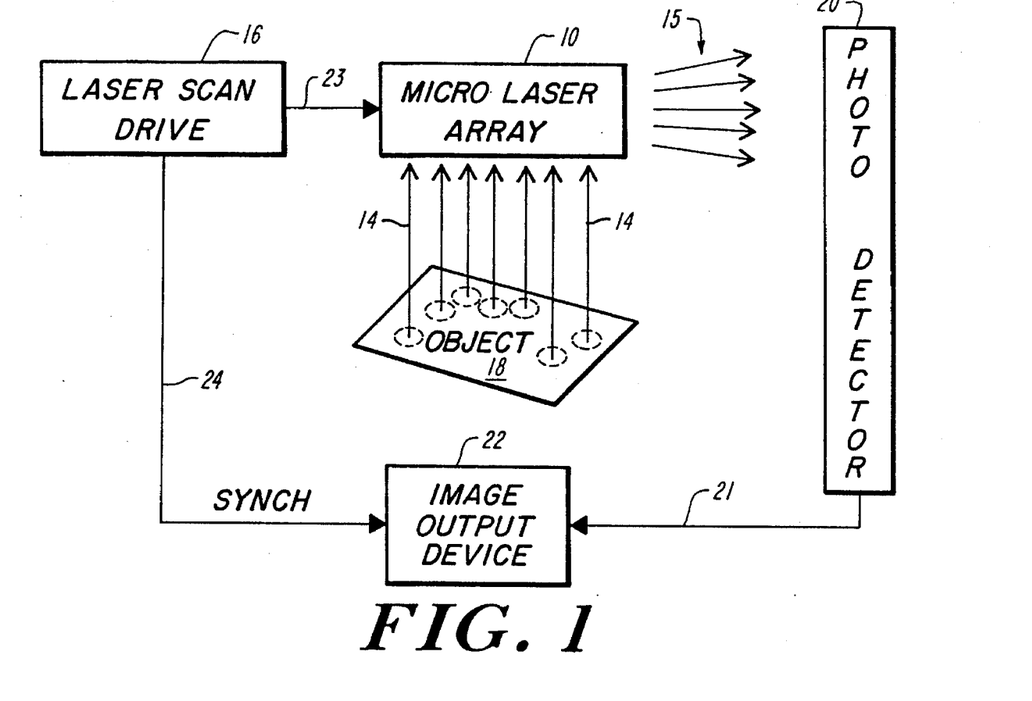
FIG. 1 is a block diagram depicting a confocal scannable laser imaging system employing self-detection in accordance with the invention.

FIG. 1 shows a block diagram of a confocal scannable laser imaging system in accordance with the invention. A laser source 10 illuminates an object 18 with laser beams 14. The object 18 reflects portions of the beams 14 back to the laser source 10. In response to the light reflected back from the object 18. Basically, the reflected light returned to the laser source 10 from the object 18 reenters the laser cavity and affects the output intensity of the laser source 10. Thus, the source 10 experiences increases or decreases in intensity that correspond to the reflectance of the object at which its beam is directed. This property is referred to below as self-detection.

A beam splitter or other suitable optical device (S, FIG. 3) directs a portion 15 of the light from laser beams 14 to a photodetector 20. The photodetector 20 provides an image signal via conductor 21 to an image output device 22. The photodetector 20 produces a time-varying image brightness signal on conductor 21 in response to changes in the intensity of laser light 15. Thus, the image signal is representative of the reflectance of the object 18. The image output device 22 processes the image signal on conductor 21 to generate an image of the object 18.

According to the depicted embodiment, the laser source 10 is a N×M scannable microlaser array, where N and M are typically in the range of 500 to 1000. In one prototype construction, the laser source was a 10×10 matrix of microlasers, addressable in row—column fashion, each having a coherence length of approximately 70 mm. However, microlaser arrays of varying sizes and of varying coherence lengths can be employed with the invention. A laser scan drive 16 controls the time at which each microlaser in the array 10 is energized. The laser scan drive 16 can, for example, energize the microlasers in a sequence such that the array 10 is scanned in a conventional television raster fashion, at television scan rates.

When energized, each microlaser in the array 10 illuminates a different portion of the object 18 with a laser beam 14. This is preferably achieved by an objective focusing assembly, such as a lens. During operation, the laser scan drive 16 sequentially scans the source 10, via drive line 23, to energize each microlaser. As reflected laser light from a particular microlaser source is reflected back to the microlaser source from the object 18, the particular microlaser source automatically, and essentially instantaneously, modulates its output intensity. The photodetector 20 detects the output intensity from each microlaser by way of a deflected portion 15 of the laser light, and provides a correspondingly modulated output signal, while the source is on, along line 21 to image output device 22. The laser scan drive 16 controls the microlaser array 10 to provide scanned, e.g., raster illumination of the object 18. The drive 16 also provides a SYNCH signal on conductor 24 to the image output device 22. The SYNCH signal enables the image output device 22 to coordinate each image signal from detector 20, due to actuation of each microlaser source, synchronously with the electronic scanning actuation of source array 10. In this way, the image output device 22 provides a video image of the object 18.

Figure 2:
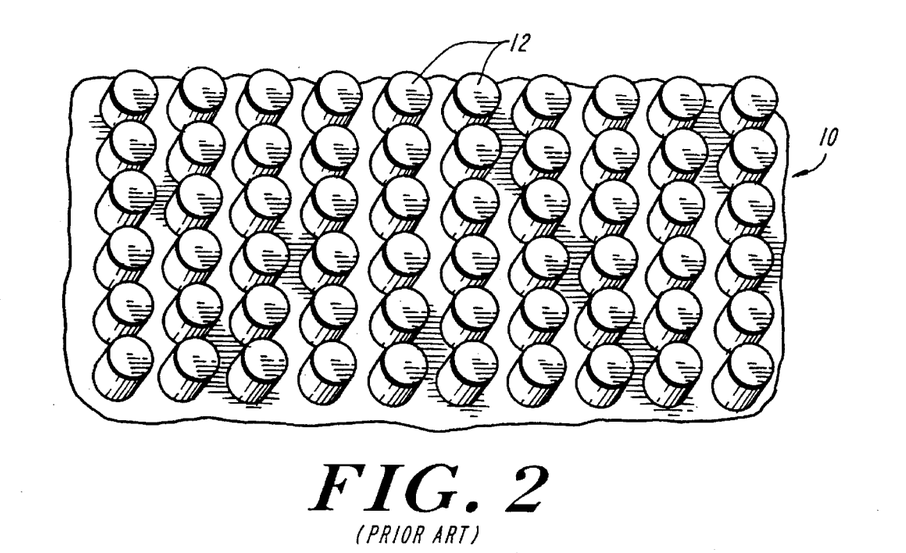
FIG. 2 is a schematic diagram of a scannable microlaser source utilized in accordance with the invention.

FIG. 2 depicts a scannable microlaser source 10 according to one embodiment of the invention. More particularly, FIG. 2 shows an array 10 of microlasers 12. Such microlasers can be, for example, low threshold electrically-pumped vertical-cavity surface-emitting diode lasers. A two-dimensional microlaser array of this embodiment is contained on an integrated circuit fabricated by AT&T Bell Laboratories, Murray Hill, N.J. Other microlaser arrays are available from Photonics Research, Inc., Broomfield, Colo. The lasers emit light perpendicularly to the surface of the chip. Each square centimeter of the chip contains approximately two million individual lasers.

Current microlaser arrays consist of two interference mirrors formed by alternating layers of aluminum arsenide an gallium arsenide, around an active region of indium gallium arsenide, all grown on a gallium arsenide substrate. This structure is covered with a gold electrical contact and etched by chemically assisted ion beam lithography to form cylindrical lasers.

A preferred practice of the invention utilizes a microlaser source array 10 in which the individual lasers have diameters of between 1 μm–5 μm. In a typical embodiment, the microlasers are 2 μm in diameter on centers 2 μm apart, so that a 512×512 array, for example, is approximately 1 mm square. Those skilled in the art will appreciate that a 512× 512 array can be imaged to provide a level of detail compatible with current television, and that proposed high-definition television standards will require a 1024×1024 array. The microlaser array is preferably incorporated in conjunction with one or more lenses L. In a presently preferred embodiment, a single objective lens, such as a ten or twenty power microscope objective, may focus the entire laser array on the object, assuring that each laser receives back, and is modulated by, light reflected from the point which it illuminates.

Figure 3:
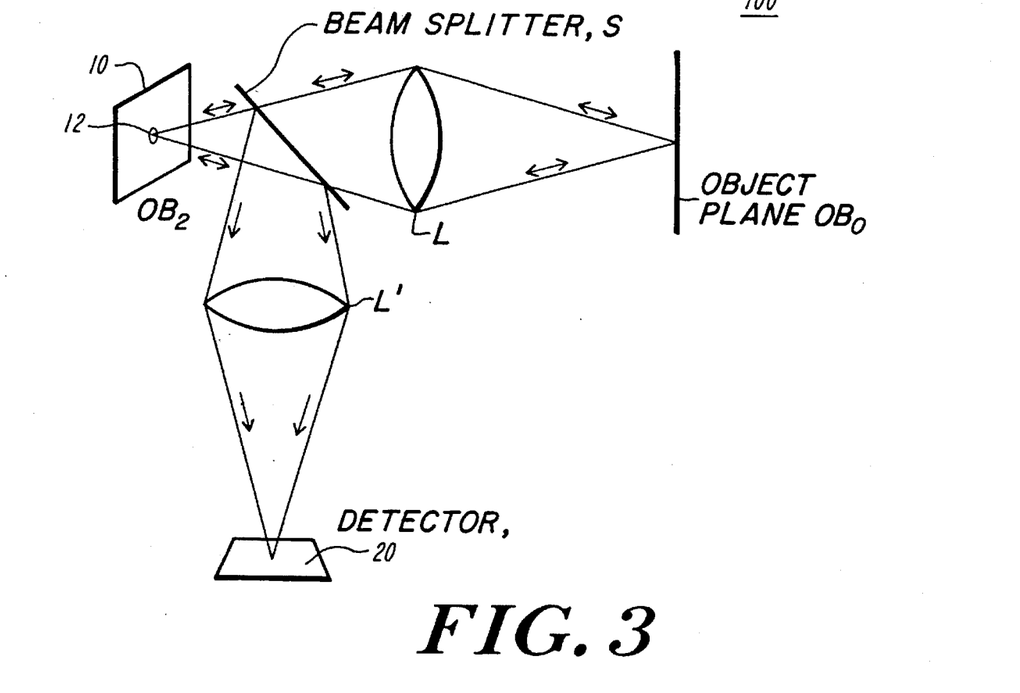
FIG. 3 depicts a confocal scanning microscope (CSM) in accordance with the invention.

FIG. 3 depicts a microlaser microscope 100 with self-detection in accordance with the invention. A beam splitter S directs a portion of the light from scanned source array 10 onto the detector 20. Lens L focuses the light from source array 10 onto the object plane $OB_0$, and also directs light reflected from the object back to source array 10. As used herein, the term lens refers to any optical assembly having focusing power for imaging, including both simple and compound lenses, curved mirrors, arrays of focusing elements or the like. The confocal configuration depicted in FIG. 3 employs a lens L' to direct a portion of the light emitted from source 10 onto corresponding regions of a detector 20, in a manner discussed below. Detector 20 can be, for example, a single avalanche photodiode detector (APD). Alternatively, detector 20 can be an array of detector elements in order to multiplex signal acquisition. Where detector 20 is an array, each detector in the array detects light from a portion of source 10 in unison.

According to the invention, each laser 12 functions both as a confocal "moving" pinhole and as a "moving" spot laser. During operation of one embodiment, each microlaser 12 is energized for a period of time and then de-energized for a period of time, so that the array 10 appears to have a moving spot of light running along it. Lens L' focuses the whole array 10 onto an APD 20 having a diameter of 0.7 mm. Accordingly, the APD 20 detects light from the source 10, not light reflected from the object $OB_0$. Light remitted from the object $OB_0$ falls on its originating laser 12, so the small emitting face functions as a pinhole aperture or stop in the confocal condition, and causes that laser 12 to lase more strongly. One way to view this is that the laser 12 is acting simultaneously as a light amplifier, adding the amplified light to its output, which the APD 20 detects. The lasers 12 have a bandwidth of about 10 nm, so the coherence length is approximately 70 mm. With this arrangement, bright parts of the object result in well defined differences in laser output intensity.

In another realization of the invention, the laser drive voltage can be sensed. Although the drive voltage is in some ways more direct, it lacks the noise free gain of the APD 20 and is more complex to implement.

The microlaser microscope differs optically from other confocal laser microscopes in that scanning takes place at an object plane $OB_0$. All optical devices have two sets of distinct planes—those conjugate to the object and image and those conjugate to the pupil or aperture. Angles in one of these sets of planes translate to positions in the other set. All other scanning laser confocal microscopes use some device in an aperture plane to change the angle of the laser beam(s). That procedure then changes the position of the laser spot in the object planes. The confocal scanning laser microscope 100 is more like the disk scanning confocal microscopes in that its scanning takes place in an object plane. That difference allows fewer optical components, as shown in FIG. 3, because there need be no access to an aperture plane.

One of the advantages of the microlaser microscope is that it can be multiplexed. That is, more than one laser 12 can be energized at once. It is not desirable to attain the level of multiplexing used by the disk scanners, since our VCSELs do better on a low duty cycle. Thus, according to one embodiment, the invention multiplexes, for example, a 1000×1000 array of microlasers onto an array of one hundred APDs. According to other embodiments, different size laser source arrays can be multiplexed to different size detector arrays. In the case where multiplexing is employed, the source array 10 can be spatially divided into subarrays of microlasers. One photosensitive detector in the detector array 20 can be assigned to each subarray of microlasers. At any particular instant in time, one microlaser 12 in each subarray can be energized. However, all of the detectors in the array 20 detect in unison.

Because the entire system can be implemented with one solid state device, a microscope constructed in accordance with the invention can be as small as a few millimeters in size. In particular, a confocal scanning laser microscope can be housed in a container approximately the size of a 35 mm film canister, or smaller. This compact size renders the invention especially useful for remote sensing applications, endoscopy, hand-held inspection microscopes, and many other applications requiring a small imaging system.

Figure 4:
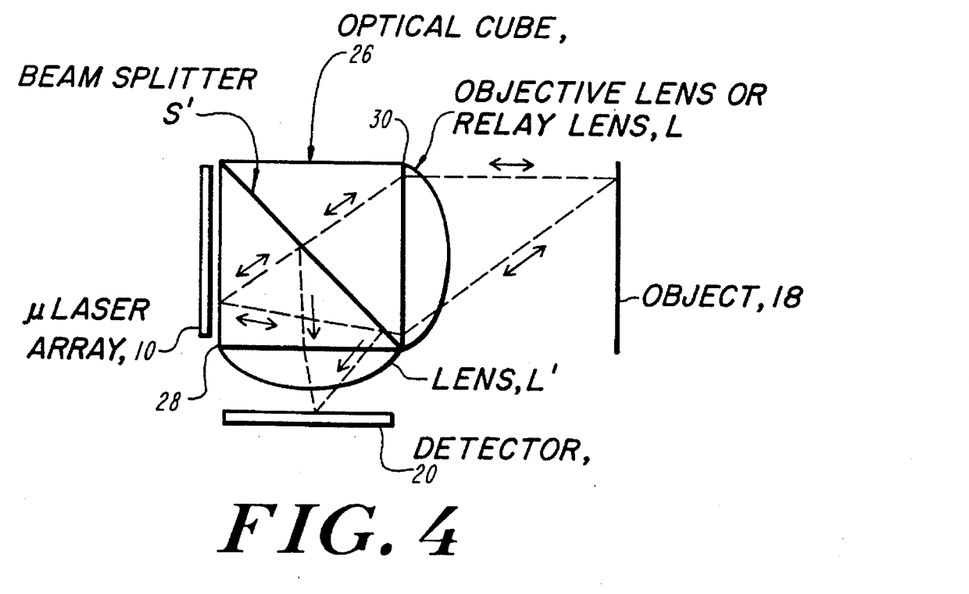
FIG. 4 depicts a compact laser imaging system in accordance with the invention.

FIG. 4 depicts a compact embodiment employing self-detection in accordance with the invention. The embodiment of FIG. 4 employs a cube beam splitter 26. The microlaser source array 10 is mounted to a first surface 28 of the cube 26, and emits beams of light along a first optical path at the object 18 through an objective lens or relay lens L. Lens L is mounted on a second surface 30 opposing surface 28. The lens L directs light from the source 10 to the object 18 and also directs light reflected from the object 18 back to its originating point on the surface of the laser source 10. A photosensitive detector 20 mounts to a third surface 28 of the cube 26. As discussed above, the detector 20 can be either a single detector of sufficient surface area or a scan addressable array of photosensitive detectors. The prism or cube 26 includes a beam splitter S' for directing a portion of the light from laser array 10 to the detector 20 by way of lens L'. As in the embodiments discussed previously, the detector monitors the output intensity of each of the microlasers 12 included in array 10 to generate an imaging signal, as shown in FIG. 1. The lens L' assures that all laser light reflected by the beam splitter reaches the photodiode.

Figure 5:
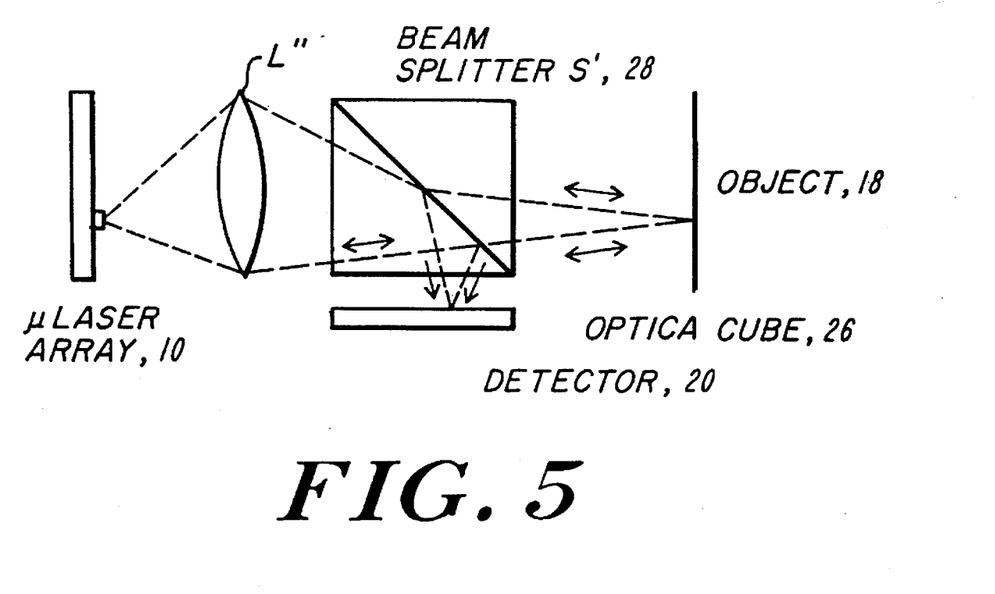
FIG. 5 depicts an alternate embodiment of the compact system of FIG. 4.

FIG. 5 depicts an alternate embodiment of the compact system of FIG. 4, the lenses L and L' can be replaced by a single lens L" coupled between the laser array 10 and the first surface 28. The lens L" can direct light from the source 10 to the object 18 and to the detector 20. The lens L" also directs light reflected from the object 18 back to its originating point on the surface of the laser source 10.

Figure 6:
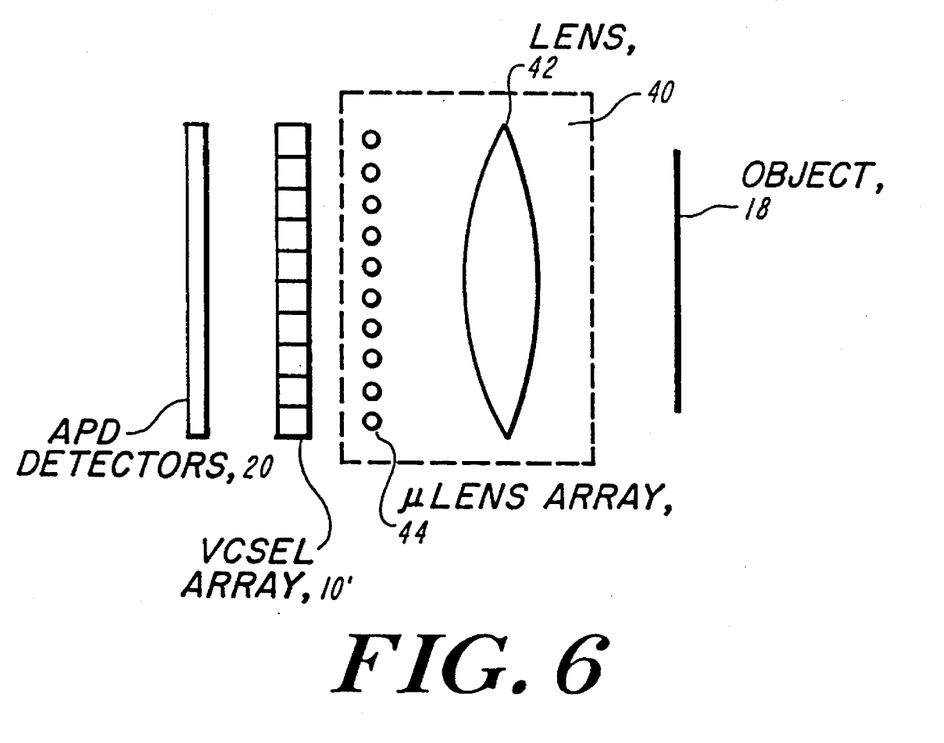
FIG. 6 shows an alternative embodiment of the present invention.

A laser imaging device according to the present invention may also be implemented as shown in FIG. 6, requiring some special device fabrication rather than off-the-shelf components. In this embodiment, a laser array 10' such as a VCSEL array is specially fabricated to emit a portion of its laser output from each end of the array. Thus, the row and column electrodes for matrix addressing, are desirably transparent, or partially reflective, defining lasing mirrors, and are fabricated on the front and back surfaces, respectively, with the addressing logic moved off chip, or off of the entire lasing surface region. In this embodiment, the lasers themselves act as beam splitters, with a portion of their beam passing to an APD or set of detectors 20 and the beams from the opposite ends of each laser of the array passing to an optical element 40 which directs it at the object 18 which is to be imaged. Optical element 40 may be implemented as a single objective lens assembly 42, or as a microlens array 44 with each microlens aligned with one or more lasers of the array 10'. Such a microlens array may be fabricated as a hologram by techniques known in the art, and after fabricating an initial master hologram they may be formed very cheaply or as a thin sheet manufactured by stamping or molding techniques, thus allowing the entire assembly to be implemented in a thin sheet, chip or board.

It will thus be seen that the invention efficiently attains the objects set forth above, among those made apparent from the preceding description. It will be understood that changes may be made in the above construction and in the foregoing sequences of operation without departing form the scope of the invention. For example, while the invention has been described in connection with arrays of surface-emitting diode lasers, the invention can also be practiced with both other scannable and individual laser light sources. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. A laser imaging system, said system comprising a laser source including a microlaser array having a plurality of microlasers at a corresponding plurality of positions of the array which are actuable to produce separate microlaser beams at said plurality of positions optical means defining an optical path to an object and placing said plurality of positions conjugate to the object so that as said microlaser beams are turned on they are each directed at a respective focal position of the object and light reflected therefrom is returned to said plurality of positions of the array, each microlaser being of a size to constitute a confocal pinhole so returned light from its respective focal position modulates its microlaser beam, splitter means for providing a portion of each of said plurality of microlaser beams to a second optical path, and detector means for converting light striking said detector means to an electrical signal, said detector means being located in said second optical path so that output of said detector means corresponds to microlaser light which had been emitted from microlasers of said plurality of microlasers, focused on the object and reflected from a corresponding position of said object and back to said microlasers, said detector means thus providing a time-varying signal representative of confocally collected light which varies with object brightness, and forming an electronic image signal of the object.

2. A system according to claim 1 wherein said microlaser array is electrically scannable for emitting said microlaser beams as non-overlapping laser beams in response to electrical excitations and said system further comprises means for generating time-variant electrical excitations to address said microlaser array in an excitation scanning pattern.

3. A system according to claim 2 wherein said splitter means includes means for deflecting a portion of each of said non-overlapping laser beams along said second optical path.

4. A system according to claim 2 wherein said detector includes means for generating an electrical signal representative of intensity of said portions of said non-overlapping laser beams.

5. A system according to claim 4 wherein said detector comprises an array of detectors, having a number of source microlasers in said microlaser array which is greater than the number of detectors in said array of detectors, and wherein plural ones of said detectors detect in unison.

6. A system according to claim 5 further comprising second optical means for focusing said portions of said microlaser beams onto said photosensitive detector.

7. A system according to claim 5 wherein said detectors are avalanche photodiode detectors.

8. A system according to claim 5 wherein said excitation scanning pattern provides for exciting a subset of said microlasers in unison, wherein the subset has a number of said microlasers in said subset equal to the number of detectors in said array of detectors.

9. A system according to claim 2 wherein said detector comprises a single detector surface area such that each of said portions of said non-overlapping laser beams fall incident on said single detector area.

10. A system according to claim 9 wherein said detector comprises an avalanche photodiode detector.

11. A system according to claim 2 wherein said system is a confocal scanning laser microscope wherein the time variant electrical excitations scan the object by controlling the position of an illumination spot in an object plane.

12. A system according to claim 1 further comprising first optical means for focusing said laser beam onto an object and for directing said laser source.

13. A system according to claim 1 wherein said splitter means further comprises a beam splitter cube having opposing first and second surfaces in said first optical path, and a third surface in said second optical path, said beam splitter cube also including a beam splitter for deflecting said portion of said microlaser beams along said second optical path.

14. A system according to claim 13 wherein said laser source is optically coupled to said first surface and said photosensitive detector is optically coupled to said third surface.

15. A system according to claim 14 wherein said optical means includes a first lens optically coupled to said second surface for directing said microlaser beams from said beam splitter to said object and for directing said light reflected from said object back to said laser source.

16. A system according to claim 15 comprising a second optical means including a second lens optically coupled to said third surface for focusing said portion of said microlaser beams onto said photosensitive detector.

17. A confocal laser imaging system using self-detection comprising a laser source including an electrically scannable array of microlasers for emitting a plurality of non-overlapping laser beams, said microlasers each having a beam emitting face constituting a pinhole such that light reflected back to said laser source from an object re-enters and modulates intensity of said microlasers, a cube having opposing first and second surfaces in optical alignment, and a third surface, said laser source being optically coupled to said first surface, and said cube including means for deflecting a portion of each of said laser beams to said third surface, and a detector optically coupled to said third surface for generating an electrical signal representative of intensity of each of said portions of said laser beams such that when said microlasers are actuated in a time-variant order to scan an object the detector produces an electronic image signal of the object.

18. A system according to claim 17 further comprising focusing means including a first lens optically coupled to said second surface for focusing said plurality of laser beams onto an object and returning light reflected from an object to said laser source to modulate laser beam intensity, and including a second lens for focusing each of said portions of said laser beams onto said detector.

19. A system according to claim 17 further comprising a lens coupled between said laser source and said first surface for focusing said plurality of laser beams onto an object and onto said photosensitive detector, and for returning light reflected from an object to said laser source to modulate laser beam intensity.

20. A confocal laser imaging method using self-detection comprising the steps of projecting a laser beam from a laser source having a beam-emitting face to illuminate an object, directing light reflected from the object back to said laser source such that the beam-emitting face constitutes a pinhole that selectively allows light reflected from a focal region of the object to enter the laser source and to modulate intensity of said laser beam, deflecting a portion of said laser beam to a photosensitive detector, detecting intensity of said portion of said laser beam and generating an electrical signal representative thereof, and processing said electrical signal to generate an image of an object.

21. A microlaser imaging device comprising a detector for converting light impinging thereon to an electrical output signal, an array of microlasers extending over a region and having first ends directing laser light at said detector, and second ends directing laser light in an opposite direction, an optical element imaging said laser light directed in the opposite direction at an object so that light reflected from the object is returned by said optical element to said array of microlasers, wherein each microlaser of said array of microlasers forms a pinhole such that light from a focal region of the object is selectively admitted to the microlaser and modulates its output in accordance with brightness of said focal region so that the electrical output signal of the detector is representative of an image of the object.

* * * * *

UNITED STATES PATENT AND TRADEMARK OFFICE
CERTIFICATE OF CORRECTION

PATENT NO.    : 5,563,710
DATED         : October 8, 1996
INVENTOR(S)   : Robert H. Webb et al.

It is certified that error appears in the above-identified patent and that said Letters Patent is hereby corrected as shown below:

Column 1,
Line 3, prior to "BACKGROUND OF THE INVENTIONS", please insert the following paragraph:
-- STATEMENT REGARDING FEDERALLY SPONSORED RESEARCH OR DEVELOPMENT This invention was made with Government support under Contract No. DE-FG02-ER61229 awarded by the Department of Energy. Accordingly, the U.S. Government has certain rights in this invention. --

Signed and Sealed this

Twelfth Day of August, 2003

JAMES E. ROGAN
*Director of the United States Patent and Trademark Office*